UNITED STATES PATENT OFFICE.

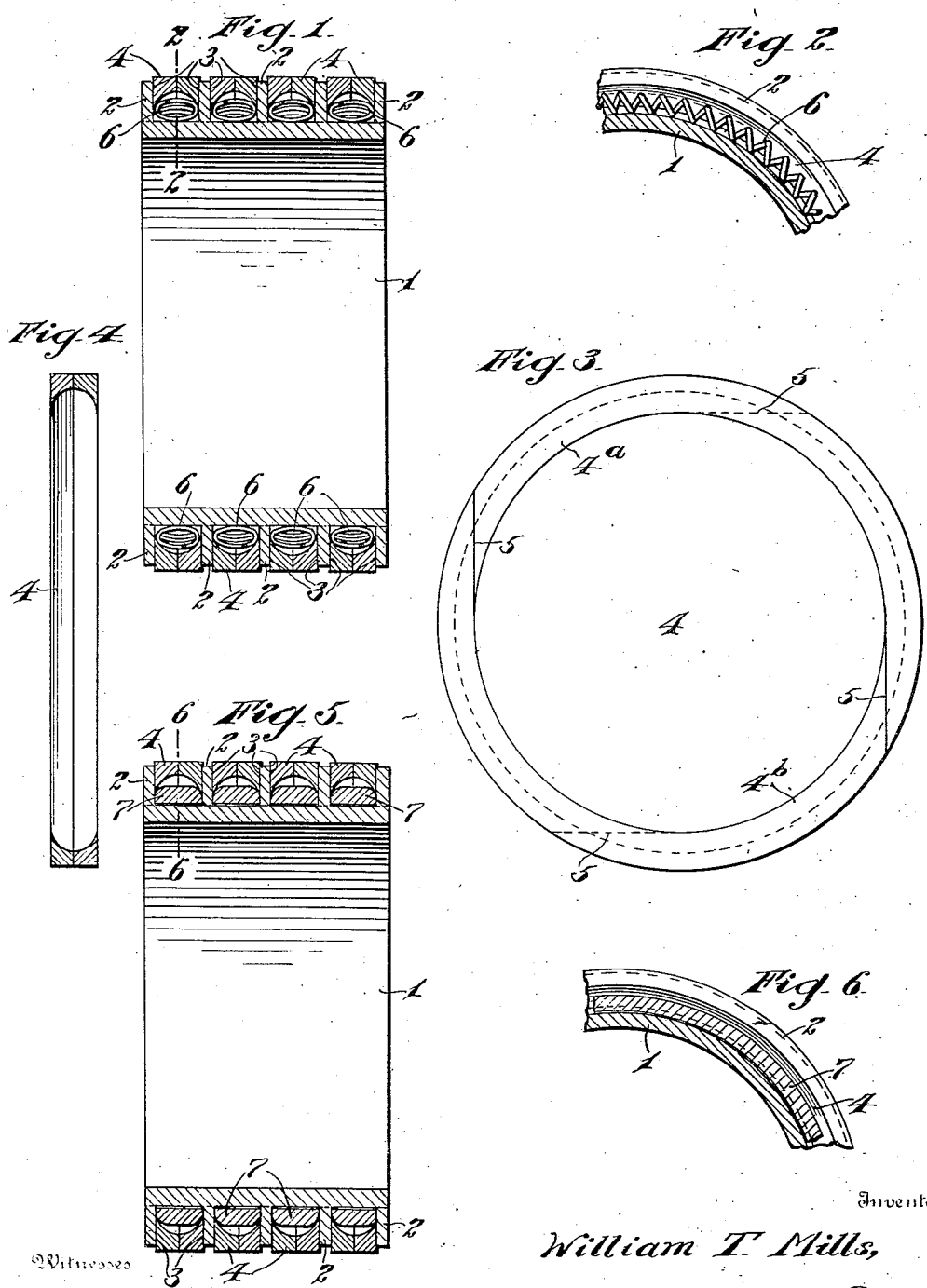

WILLIAM T. MILLS, OF CAMDEN, NEW JERSEY.

PACKING-RING.

955,527.   Specification of Letters Patent.   Patented Apr. 19, 1910.

Application filed May 17, 1909. Serial No. 496,462.

*To all whom it may concern:*

Be it known that I, WILLIAM T. MILLS, a citizen of the United States, residing at Camden, in the county of Camden and State of New Jersey, have invented certain new and useful Improvements in Packing-Rings, of which the following is a specification.

My invention relates to improvements in packing rings, and more particularly designed for use on pump plungers or other forms of piston, the object of the invention being to provide a simple inexpensive, durable and effectual packing, which can be readily placed in position, and most effectually operated to prevent the passage of water around the plunger.

With these and other objects in view, the invention consists in certain novel features of construction, and combinations, and arrangements of parts as will be more fully hereinafter described and pointed out in the claim.

In the accompanying drawings, Figure 1, is a view in cross section illustrating my improvements. Fig. 2, is a view in section on the line 2—2 of Fig. 1. Fig. 3, is a side view of one of the packing rings. Fig. 4, is a view in cross section thereof. Figs. 5 and 6, are views illustrating a modification.

1 represents a sleeve, and 2 are rings, which are shrunk onto the sleeve 1 to form a series of annular grooves 3 to receive therein my improved packing rings 4. In each of the grooves, two of these packing rings 4 are positioned, and each ring 4 comprises two sections 4ª and 4ᵇ as clearly shown in Fig. 3. These sections are in effect, a single ring with straight slits as at 5, so as to allow the sections to expand relatively to each other. These packing rings are rounded on their inner edges, so that when two of these rings are together within a groove 3, the inner faces or edges of the rings will be concave as clearly shown, and are pressed outwardly by means of coiled springs 6 positioned around the sleeve in the grooves 3, and owing to this concave formation of the packing rings, it will be noted that the spring not only serves to exert outward pressure on the rings, but also presses them laterally, or in other words, toward the end walls of the grooves to tightly bind the packing rings against said end walls, and absolutely prevent the passage of water around the rings. The coiled springs 6 illustrated, are somewhat flattened or elliptical in cross section, but I of course, do not limit myself to the precise form of these springs.

In Figs. 5 and 6, I illustrate a modification, in which a spring is employed, which is in the form of snap rings 7, which are curved on their outer faces in cross section as clearly shown, and serve the same functions as do the coiled springs 6.

Various slight changes might be made in the general form and arrangement of parts described without departing from my invention, and hence I do not restrict myself to the precise details set forth, but consider myself at liberty to make such changes and alterations as fairly fall within the spirit and scope of the claim.

Having thus described my invention what I claim as new and desire to secure by Letters Patent is:

In a packing ring, the combination with a sleeve having an annular groove therein, of a device in said groove around the sleeve and rounded in cross section, a packing ring in the groove around said device and comprising two parallel members having rounded inner edges in cross section in engagement with the rounded faces of said device, each of said members comprising two half sections divided on parallel lines tangent to its inner diameter and upon opposite sides of the member, the adjacent faces thus formed being in close contact, and said members having a separating movement longitudinally of said contacting faces only, said members being so positioned that the parallel contacting faces of the sections of one member will be at right angles to the parallel contacting faces of the sections of the other member, substantially as described.

In testimony whereof I have signed my name to this specification in the presence of two subscribing witnesses.

WILLIAM T. MILLS.

Witnesses:
R. H. KRENKEL,
J. A. L. MULHALL.